US009492985B2

(12) United States Patent
Marshall

(10) Patent No.: US 9,492,985 B2
(45) Date of Patent: Nov. 15, 2016

(54) PROCESS FOR THE PRODUCTION OF A CONTAINER

(75) Inventor: Neil Roderick Marshall, Fareham (GB)

(73) Assignee: HUHTAMAKI OYJ, Espoo (FI)

( * ) Notice: Subject to any disclaimer, the term of this patent is extended or adjusted under 35 U.S.C. 154(b) by 925 days.

(21) Appl. No.: 13/640,234

(22) PCT Filed: Jan. 6, 2011

(86) PCT No.: PCT/EP2011/000026
§ 371 (c)(1),
(2), (4) Date: May 20, 2013

(87) PCT Pub. No.: WO2011/124287
PCT Pub. Date: Oct. 13, 2011

(65) Prior Publication Data

US 2013/0288870 A1 Oct. 31, 2013

(30) Foreign Application Priority Data

Apr. 9, 2010 (DE) ........................ 10 2010 016 390
Jul. 6, 2010 (EP) .................................... 10006948

(51) Int. Cl.

| | |
|---|---|
| ***B32B 3/26*** | (2006.01) |
| ***B31B 3/26*** | (2006.01) |
| ***B31B 1/25*** | (2006.01) |
| ***B31B 1/28*** | (2006.01) |
| ***B31B 15/00*** | (2006.01) |
| ***B31B 17/00*** | (2006.01) |

(Continued)

(52) U.S. Cl.
CPC . *B31B 3/26* (2013.01); *B31B 1/25* (2013.01); *B31B 1/28* (2013.01); *B31B 15/00* (2013.01); *B31B 17/00* (2013.01); *B31B 45/00* (2013.01); *B31F 1/0038* (2013.01); *B31F 1/08* (2013.01); *B31F 1/10* (2013.01); *B65D 1/265* (2013.01); *B65D 81/3869* (2013.01); *B65D 81/3876* (2013.01); *B65D 85/816* (2013.01); *B31B 2201/252* (2013.01); *B31B 2201/255* (2013.01); *B31B 2201/2604* (2013.01); *B31B 2201/2695* (2013.01); *B31B 2217/003* (2013.01); *B31B 2217/0023* (2013.01); *B31B 2217/062* (2013.01); *B31B 2217/064* (2013.01); *B31B 2217/082* (2013.01); *B31B 2217/108* (2013.01)

(58) Field of Classification Search
CPC .................. B31B 2217/003; B31B 2201/252; B31B 3/26; B31B 2217/082; B31B 2217/0023; B31B 2201/2604; B31B 45/00; B31B 2217/064; B31B 1/28; B31B 201/2695; B31F 1/0038; B31F 1/08; B65D 1/265; B65D 81/3876; B65D 81/3869
USPC ...................................... 229/400; 220/592.17
See application file for complete search history.

(56) References Cited

U.S. PATENT DOCUMENTS 1,983,361 A 12/1934 Gazette
1,992,145 A 2/1935 Conti
(Continued)

FOREIGN PATENT DOCUMENTS

EP 1227042 A1 7/2002
EP 1227043 A1 7/2002

*Primary Examiner* — Robert Long
*Assistant Examiner* — Xavier A Madison
(74) *Attorney, Agent, or Firm* — Husch Blackwell LLP

(57) ABSTRACT

Process for the production of a container (1) with first a sidewall (2) which comprises at least one compressed shaping (5.1, 5.2).

14 Claims, 4 Drawing Sheets

(51) Int. Cl.

| | |
|---|---|
| ***B31B 45/00*** | (2006.01) |
| ***B31F 1/00*** | (2006.01) |
| ***B31F 1/10*** | (2006.01) |
| ***B65D 1/26*** | (2006.01) |
| ***B65D 81/38*** | (2006.01) |
| ***B65D 85/816*** | (2006.01) |
| ***B31F 1/08*** | (2006.01) |

(56) References Cited

U.S. PATENT DOCUMENTS

| | | | | |
|---|---|---|---|---|
| 3,007,377 | A | 11/1961 | Muller | |
| 3,223,305 | A | 12/1965 | Edwards | |
| 5,663,926 | A | 9/1997 | Haseo | |
| 6,193,098 | B1 * | 2/2001 | Mochizuki ................ | B31B 7/00<br>220/592.17 |
| 6,260,756 | B1 | 7/2001 | Mochizuki et al. | |
| 2004/0226948 | A1 * | 11/2004 | Okushita ................... | B31B 1/25<br>220/62.18 |
| 2009/0184020 | A1 * | 7/2009 | Messerschmid .......... | B31B 1/60<br>206/503 |

* cited by examiner

PROCESS FOR THE PRODUCTION OF A CONTAINER

The present invention relates to a process for the production of a container with a first sidewall which comprises at least one shaping.

Such containers which are preferably cups are known from the state of the art for example from EP 1 227 042 B1, EP 1 227 043 B1 and U.S. Pat. No. 5,663,926 B1. The containers according to the state of the art lack, however, stiffness and the production process is relatively complicated.

It was therefore the objective of the present invention to provide a process which does not have the deficiencies according to the state of the art. Furthermore, the process should result in a stiff container which is more easily produced than containers according to the state of the art.

This problem is attained with a process for the production of a container with a first sidewall which comprises at least one shaping, whereas the shaping is compressed.

The present invention relates to the production of a container. Particularly, the container is a cup in which beverages, especially hot beverages such as coffee or tea or food especially soup can be served. This container is preferably made of paper, thick paper, cardboard, fiber material, plastic material, materials made from renewable and/or biodegradable raw materials or a combination thereof. More preferably, the material is plastically deformable for example embossable and even more preferable also elastically deformable. All parts of the inventive container are made from this material, whereas the individual parts of the container can be made from different materials. Especially the surface of the parts of the containers which are subjected to a liquid and/or vapour are provided with means, especially a coating, an impregnation, a film or the like which makes these parts at least temporary resistant against for example humility, water, aqueous solution, oil and/or fat or a combination thereof. Preferably the above mentioned means are also heat sealable. The container according to the present invention comprises a first sidewall which is preferably conically shaped and which more preferably has at its upper end a rolled rim. The first sidewall is preferably made from a flat segment, which is subsequently formed, preferably rolled, into its for example a conical sidewall. Preferably at its lower end, the sidewall is connected to a base in order to close the container at the bottom. The base is preferably a separate part which is attached more preferably glued or heat sealed to the lower end of the first sidewall of the container.

According to the present invention, the first sidewall comprises at least a lower shaping which extents at least partially, preferably entirely, around the circumference of the first sidewall. This shaping can be directed inwardly and/or outwardly; i. e. towards the content of the container and/or away from the content of the container. The shaping can alternate between an inward direction and an outward direction. This alternation is preferably harmonic. This shaping can be produced by any technique known by a person skilled in the art, e. g. by folding or any other methods of plastic deformation. Preferably the shaping is inserted into the cardboard-segment before it is formed, e. g. rolled into the final shape of the sidewall. More preferably, the shaping is an embossment which is produced for example by applying locally pressure and/or heat to the sidewall or sidewall-segment and deforming the material of the sidewall plastically. The shaping can have any form known by a person skilled in the art. However, it should be compressible at least partially especially in case an axial force preferably axial pressure is applied to the sidewall. Preferably a shaping is U-shaped or has at least partially the shape of a segment of a circle.

This shaping is now, according to the present invention, compressed in its height extension, i. e. after the compression of the shaping, the sidewall is reduced in its height. Due to the compression of the shaping in its height, preferably the radial extension of the shaping increases at least partially. More preferably, the compression of the shaping is elastic, i. e. as soon as the deformation force is removed, the shaping resumes at least partially its original shape. Thus, in this preferred embodiment of the present invention, the deformed shaping functions as a spring.

Preferably, the first sidewall comprises a second, higher shaping, which is closer to the upper rim of the container than the lower shaping, whereas the disclosure made regarding the first, lower shaping also applies to the second, higher shaping.

Preferably, both shapings are compressed, whereas more preferably, the shapings are compressed sequentially. More preferably, firstly the lower shaping, which is closer to the base of the container is compressed and subsequently the higher shaping.

In a preferred embodiment of the present invention, the deformation of at least one, preferably the lower shaping, is limited in its radial extension. Thus, the shaping can only be compressed to a certain extent and not further. Subsequently, a compression force, for example applied to the base of the container is transferred to the next shaping, which is then also compressed.

Preferably, the force to compress the shaping is a compression force which is applied below the first shaping, preferably to the base of the container.

After at least one, preferably two shapings have been compressed, these shapings are fixed in their compressed state.

In one preferred embodiment of the present invention the flanks and/or edges of the shaping are sealed, glued or mechanically fixed together. Preferably, the coating of the first sidewall is utilized to seal the edges and/or flanks of the compressed shapings together.

According to another preferred embodiment of the present invention, a second sidewall is utilized to maintain the shaping in its compressed state. This second sidewall is connected to the first sidewall such that it maintains the shaping or the shapings in its/their compressed state. The second sidewall can be inside or outside the first sidewall. The two sidewalls are preferably connected in two or more different areas, especially at two or more different heights of the container. The shaping itself and/or other parts of the first sidewall can be connected to the second sidewall. Since the shaping is preferably compressed elastically, the second sidewall is preferably subjected to a tension, especially in an axial tension.

According to a preferred embodiment, the shaping is held in its compressed state by a holding force applied to the inside of the container until the second sidewall is rigidly attached to the outer circumference of the first sidewall.

Preferably, the holding force is a vacuum that is preferably applied to the inside of the container. The base and/or the sidewall can, at least partially, be exposed to the vacuum, to avoid that the shaping of the sidewall resumes their original uncompressed shape.

The invention is now explained according to FIGS. 1-4. These explanations do not limit the scope of protection of the present invention.

Figure 1:
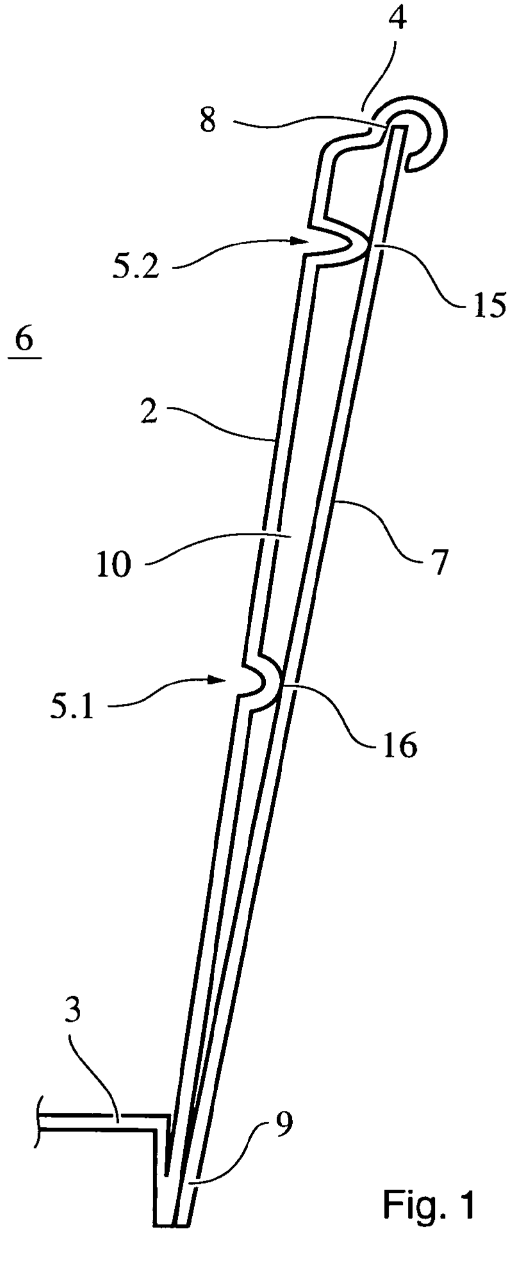
FIG. 1 shows a container produced according to the inventive process.

FIG. 1 depicts an embodiment of the container 1, in the present case a cup, with a conically shaped first sidewall 2 and a bottom 3, which is a separate part and attached to the first sidewall 2. The container 1 is entirely made from paper or cardboard. The first sidewall and the bottom 3 form a volume which can be filled with an item, for example a beverage, such as coffee, tea or a cold drink or a food, such as soup or mash or porridge. The sidewall 2 has an upper rim 4, located opposite to bottom 3. The sidewall comprises a first, here circumferential, shaping 25.1 and a second, here also circumferential, shaping 5.2, which are both plastically embossed into the material of the first sidewall. At least one, here both, shapings are compressed in their height, as further explained according to FIGS. 2*a-c*. In the present case, the first shaping 5.1 is located close to the bottom and the second shaping 5.2 is located close to the rim 4. However, it can be also advantageous to move the shapings 5.1, 5.2 closer together and/or more towards the middle of the container. Both shapings 5.1, 5.2 are oriented outwardly. Due to the compression, both shapings 5.1, 5.2 are reduced in their height and increased in their radial extension. The compression of the shaping 5.1, 5.2 is carried out elastically, so that, as soon as the compression force is removed, each shaping tries to recover, at least partially, their original uncompressed shape. Thus, the shapings 5.1, 5.2 act as a spring. In order to secure the shapings 5.1, 5.2 in their compressed state, the container according to the present example comprises a second sidewall 7, which is sealed or glued to the first sidewall 2, here to the tips of the shapings 5.1, 5.2 at the connection points 15, 16, respectively. Alternatively or additionally, the second sidewall can be connected to the first sidewall at the connection points 8, 9, respectively. While the second sidewall 7 is attached to the first sidewall 2, the shapings 5.1, 5.2 are held in their compressed shape by an external force until the connection 6, 7, 15, 16 is sufficiently rigid. Due to the spring-like behaviour of the shapings 5.1, 5.2, the first sidewall 2 is, between the connections subjected to a compressive force and the second sidewall is subjected to a tension force. Both forces improve the stability of sidewall, respectively. Between the first and the second sidewall an air gap 10 is provided which improves the insulation of the inventive cup. The shapings 5.1, 5.2 act here also as spacers between the two sidewalls 2, 7.

The person skilled in the art understands, that it can be sufficient to provide only one shaping 5.1, 5.2.

The inventive container is preferably produced by providing a flat sidewall-segment for the first sidewall 2 and embossing the embossments 5.1, 5.2 into this segment, while it is still flat. Subsequently, the segment is formed into a conus and the opposite ends of the segment are glued or sealed together. Afterwards, the embossments 5.1, 5.2 are compressed in their height, respectively, by applying a compression force. While the embossments are maintained in this compressed state, the second sidewall 7 is attached to the first sidewall, for example by gluing. Preferably, the second sidewall is provided as a flat segment and then wrapped around and attached to the first sidewall 2. After the connection between the first and the second sidewall is sufficiently rigid, the compression force can be removed and the inventive container is finalized.

The shapings 5.1, 5.2 can be introduced into the sidewall 2 after the sidewall has been formed, for example, in the shape of a conus.

Figure 2:
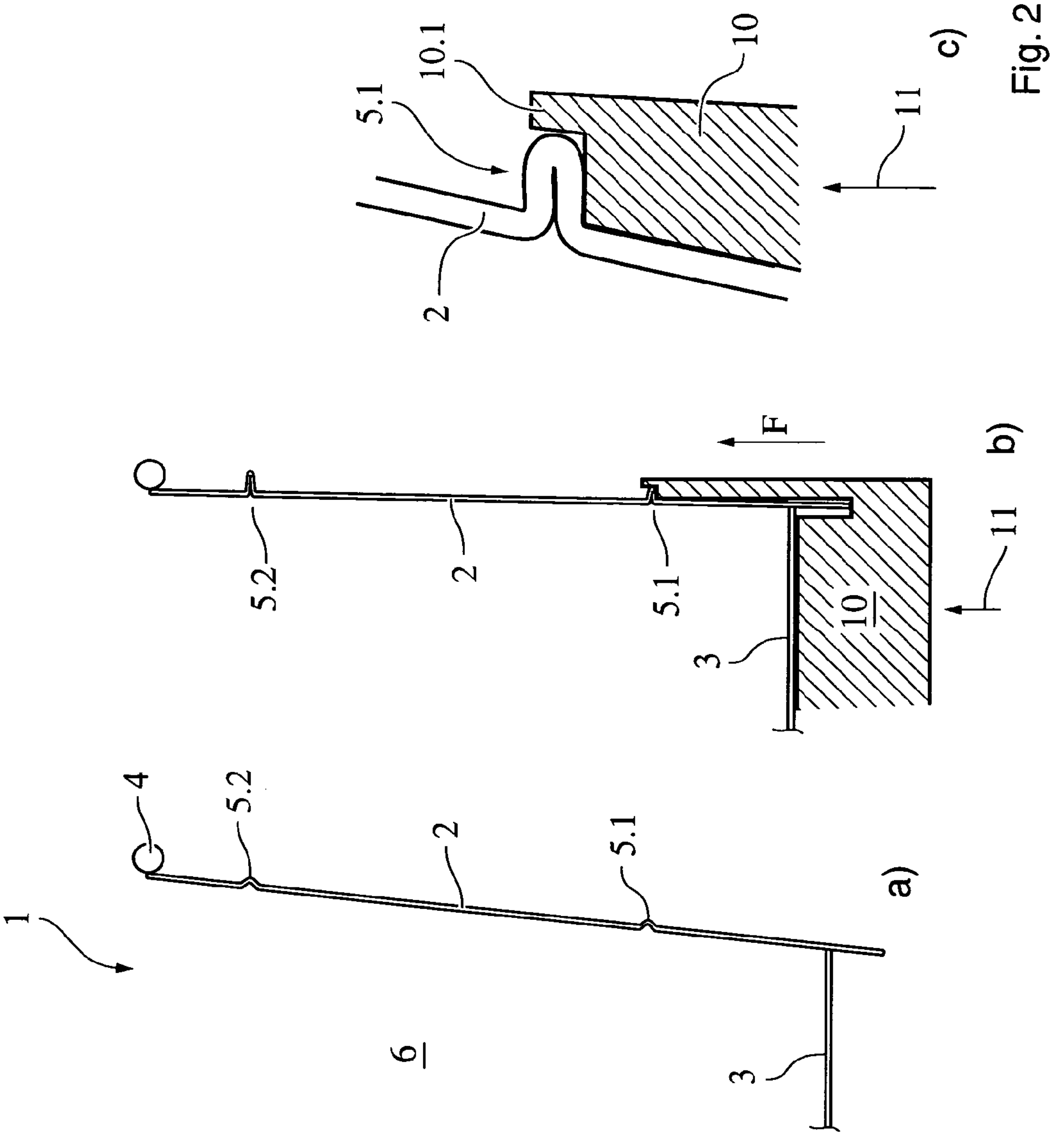
FIG. 2 shows inventive or preferred steps of the inventive process.

FIG. 2 shows the compression of the shapings 5.1 and 5.2. After these shapings have been introduced into the first sidewall and a base 3 has been attached to the first sidewall (please compare FIG. 2*a*), this sidewall is compressed, as shown in FIG. 2*b* by a pusher 10, which is moved upwards as depicted by arrow 11 and applies a force F to the sidewall as also shown in FIG. 2*b*. In this compression process, firstly the lower shaping is compressed, until the flanks of the shaping lie on top of each other. During the compression, the shaping 5.1 is decreased in its height and extended in its radial extension, until the tip of the shaping 5.1 hits the limiting means 10.1, here provided at the pusher (please compare FIG. 2*c*), so that the lower shaping cannot be further compressed. Then, after the first, lower shaping has been compressed, the force F compresses the upper shaping 5.2 until the flanks lie on top of each other. The person skilled in the art understands that the top of the container can also be pushed downwards. In this compressed state, the first sidewall is maintained for example by applying a vacuum V to the inside 6 of the cardboard container. As soon as this vacuum has been applied, the pusher 10 can be removed from the bottom 3 of the cardboard cup by a movement opposite of the upward movement. Then, the second sidewall 7 can be attached to the first sidewall in order to maintain the shapings 5.1, 5.2 in their compressed state.

Figure 3:
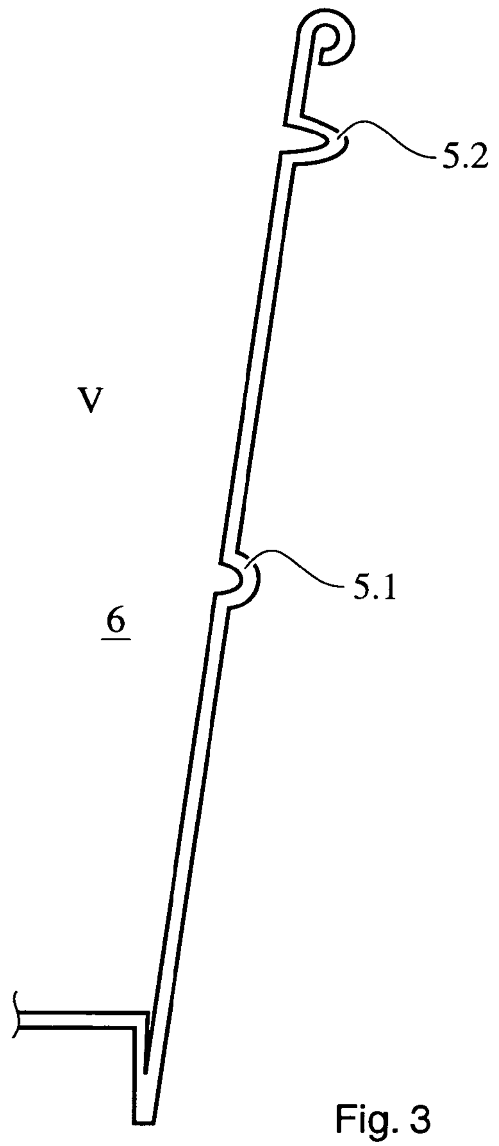
FIG. 3 shows the application of vacuum to maintain the shaping in its compressed state.

FIG. 3 shows this application of the vacuum V to the inside of the container 6. The compressed shapings 5.1, 5.2 act as springs and try to expand the sidewall 2, as depicted by the arrow. The vacuum V maintains the shapings in their compressed state until, for example, a second sidewall has been attached to the first sidewall to maintain the shapings 5.1, 5.2 in their compressed state. Then, the vacuum can be released.

Figure 4:
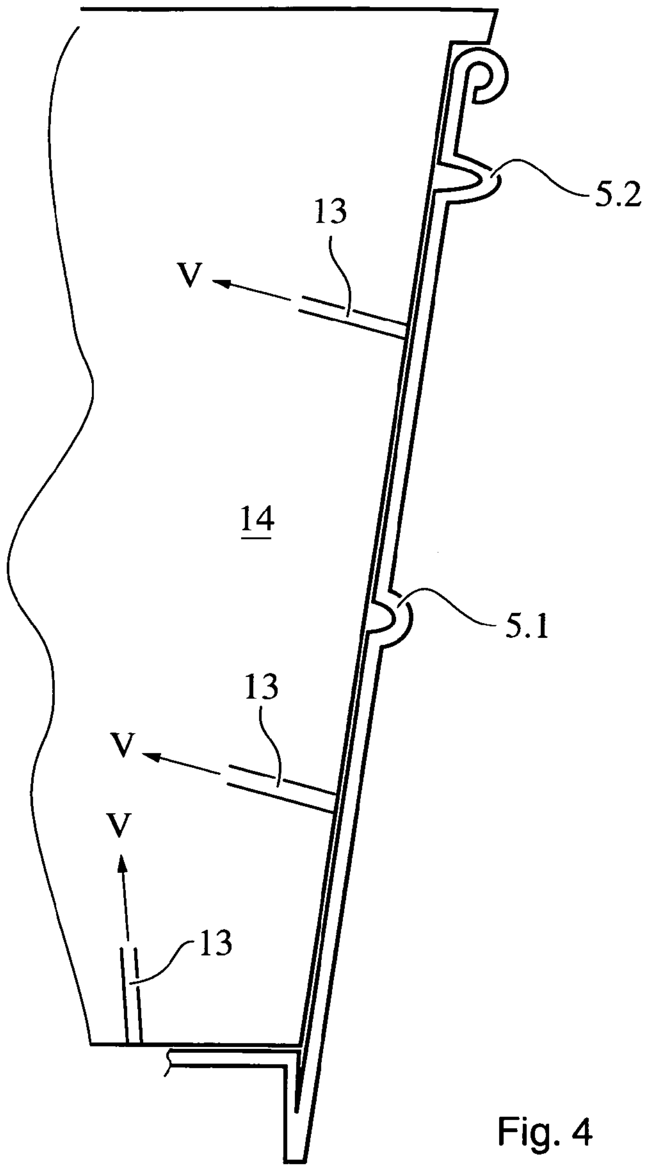
FIG. 4 shows a forming tool with vacuum channels.

FIG. 4 shows a tool 14, here a mandrel that allows the application of the vacuum. The tool has at least one, here a multitude of channels 13, which extend from a vacuum-source (not depicted) until the surface of the tool. Here the vacuum sucks the sidewall 2 and/or the bottom 3 against the toll and thus maintains the shaping in their compressed state, because the sidewall and/or the bottom cannot move relative to the container.

LIST OF REFERENCE SIGNS

1 cardboard container, cup
2 first sidewall
3 base, bottom
4 rim
5.1 lower shaping, lower embossment
5.2 upper shaping, upper embossment
6 inside of the cardboard container, cup
7 second sidewall
8 connection point
9 connection point
10 gap, air gap
11 upward movement
12 pusher
12.1 limiting means
13 vacuum-channel
14 forming-tool, mandrel
15 connection point
16 connection point
F compression force
V vacuum

The invention claimed is:

1. A process for the production of a container having a first sidewall made from at least one of a paper material and a cardboard-material and including a rim, wherein at least one shaping is provided to the first sidewall at a distance away from the rim and after the at least one shaping is provided to the first sidewall, the at least one shaping is compressed so that a height of the at least one shaping is reduced, whereby the step of compressing the at least one shaping reduces a height of the first sidewall.

2. The process according to claim 1, wherein the first sidewall comprises a first shaping and a second shaping.

3. The process according to claim 2, wherein the compressing step includes compressing the first and the second shapings sequentially.

4. The process according to claim 1, wherein during the compressing step, radial extension of the at least one shaping is restricted by a limiting means.

5. The process according to claim 1, wherein the at least one shaping is fixed in a compressed state after the compressing step.

6. The process according to claim 5, wherein the at least one shaping includes a pair of flanks and wherein the pair of flanks are sealed or glued together once the at least one shaping is compressed.

7. The process according to claim 5, wherein the at least one shaping extends at least partially around a circumference of the first sidewall and wherein a second sidewall is provided around the first sidewall and attached to the first sidewall at two or more different heights of the container to maintain the at least one shaping in its compressed state.

8. The process according to claim 7, wherein the second sidewall is connected to an outer portion of the circumference of the first sidewall.

9. The process according to claim 7 further including the step of holding the at least one shaping in its compressed state by applying a holding force to an interior of the container until the second sidewall is attached to the first sidewall and the at least one shaping is fixed in its compressed state.

10. The process according to claim 9, wherein the holding force is a vacuum.

11. The process according to claim 2, wherein during the compressing step, radial extension of the first shaping is restricted by a limiting means in a manner where the first shaping extends away from the first sidewall further than the second shaping extends away from the first sidewall after the first and the second shapings have been compressed.

12. The process according to claim 11, wherein the compressing step includes compressing the first shaping before compressing the second shaping.

13. The process according to claim 11, wherein the first and the second shapings extend at least partially around a circumference of the first sidewall and wherein a second sidewall is provided around the first sidewall and attached to the first sidewall at two or more different heights of the container to maintain at least one of the first and the second shapings in its compressed state.

14. The process according to claim 13 further including the step of holding at least one of the first and the second shapings in their compressed state by applying a holding force to an interior of the container until the second sidewall is attached to the first sidewall and at least one of the first and the second shapings is fixed in its compressed state.

* * * * *